(12) United States Patent
Schmidt

(10) Patent No.: US 7,011,497 B2
(45) Date of Patent: Mar. 14, 2006

(54) SHAFT/HUB UNIT FOR WIND TURBINE ROTOR

(75) Inventor: Richard Schmidt, Kiel (DE)

(73) Assignee: Aerodyn Engineering GmbH, Rendsburg (DE)

( * ) Notice: Subject to any disclaimer, the term of this patent is extended or adjusted under 35 U.S.C. 154(b) by 94 days.

(21) Appl. No.: 10/494,144

(22) PCT Filed: Oct. 22, 2002

(86) PCT No.: PCT/DE02/03979

§ 371 (c)(1),
(2), (4) Date: Apr. 29, 2004

(87) PCT Pub. No.: WO03/038275

PCT Pub. Date: May 8, 2003

(65) Prior Publication Data

US 2004/0253117 A1 Dec. 16, 2004

(30) Foreign Application Priority Data

Oct. 31, 2001 (DE) .............................. 101 53 683

(51) Int. Cl.
*F03D 1/06* (2006.01)
*F03D 11/00* (2006.01)

(52) U.S. Cl. ............................ 415/216.1; 416/244 R
(58) Field of Classification Search ............ 416/244 R, 416/219 R, 155, 234, 230, 244 A; 415/216.1, 415/229
See application file for complete search history.

(56) References Cited

U.S. PATENT DOCUMENTS

| 4,329,117 A | * | 5/1982 | Doman .................. 416/170 R |
| 4,915,590 A | * | 4/1990 | Eckland et al. ............. 416/225 |
| 4,966,525 A | * | 10/1990 | Nielsen ......................... 416/9 |
| 5,140,856 A | * | 8/1992 | Larsen ........................ 73/455 |
| 5,405,246 A | * | 4/1995 | Goldberg ................ 416/227 A |
| 6,371,730 B1 | * | 4/2002 | Wobben ................ 416/244 R |
| 6,759,758 B1 | * | 7/2004 | Torres Martinez .......... 290/55 |

* cited by examiner

*Primary Examiner*—Edward K. Look
*Assistant Examiner*—Nathan Wiehe
(74) *Attorney, Agent, or Firm*—Larson & Larson, PA; Herbert W. Larson

(57) ABSTRACT

A rotor shaft/hub unit for a wind energy plant with a rotor shaft provided with a rotor bearing seat which is connected to a rotor hub provided with a blade or blade bearing connection, the rotor hub and rotor shaft are manufactured in one piece from bonded fiber fabrics.

7 Claims, 1 Drawing Sheet

SHAFT/HUB UNIT FOR WIND TURBINE ROTOR

PRIOR APPLICATIONS

This is a §371 National Phase utility patent application filing basing priority on International Application No. PCT/DE02/03979, filed on Oct. 22, 2002, which bases priority on German Application No. DE 101 53 683.6, filed on Oct. 31, 2001.

BACKGROUND OF THE INVENTION

1. Field of the Invention

The invention relates to a rotor shaft/hub unit for a wind energy or power plant with a rotor shaft provided with a rotor bearing seat connected to a rotor hub provided with a blade or blade bearing connection.

2. Description of the Prior Art

Energy generation by a wind energy plant is based on the energy conversion of translatory air movement into rotary energy and which takes place by means of the rotor blades. The rotor blades, together with the rotor hub, form the rotor, which converts the rotary engine in the rotor hub into mechanical energy in torque form. Said torque is transmitted by the rotor hub into the rotor shaft and is supplied from there by means of the gear to the generator, in which the mechanical energy is converted into electrical energy. The hub and shaft are both statically and dynamically loaded with bending and torsional moments, as well as axial and transverse forces.

Conventionally the rotor hub and rotor shaft are manufactured as individual components from heat-treatable steel or nodular cast iron and are then screwed together for assembly. This construction method has various disadvantages. One disadvantage is that, as a result of the characteristics of the materials used, the individual components are very heavy, which makes component assembly more difficult. A further disadvantage is the need of screwing together the individual components. For this purpose, it is necessary to provide on the individual components complicated joining, cutting points with very narrow manufacturing tolerances. The design of screw couplings for two individual components in general, and specifically under alternating loads, makes it necessary to locally over-dimension the components at the junction point, which once again has a negative effect on component costs.

DE 35 02 963 C2 discloses another rotor, in which a pair of rotor blades are held together with a tie bar. U.S. Pat. No. 6,227,803 B1 discloses a wind energy plant with a plastic nacelle box, which is fixed to a partly elastic tower. The rotor propeller blades comprise a rod-shaped section and a plate-shaped section.

The problem of the invention is to provide a rotor, which is lightweight and easy to assemble.

SUMMARY OF THE INVENTION

According to the invention, this problem is solved in that the rotor hub and rotor are manufactured in one piece from bonded fiber fabrics.

The blade or blade bearing connection can be constructed as metallic inserts integrated into the rotor hub laminate. The rotor bearing seat can be constructed as a bush integrated into the rotor shaft laminate. Thus, the invention proposes a component combination in which the individual components, rotor hub and rotor shaft, are combined into an integral component made from bonded fiber fabrics. The combination of the two individual components into an integral component and the use of bonded fiber fabrics lead to numerous technical and economic advantages.

Compared with the conventionally used metallic materials, bonded fiber fabrics have a very high specific strength and rigidity so that whilst fulfilling the same requirements a lighter weight component can be implemented. Bonded fiber fabrics are materials which comprise one or more fiber types and a resin matrix with or without additives. A particular advantage of using bonded fiber fabrics is that random fibers with random orientation can be used, so that the direction-controlled, mechanical characteristics of the material can be precisely matched to the loading type and direction. This permits a more extensive weight optimization of the component compared with the use of metallic materials.

Through the combination of the two individual components into an integral component, there is no need to provide cutting points with narrow manufacturing tolerances, which would be necessary for the screw coupling of the individual components. There is also no need for a local component over-dimensioning to permit screw coupling. There is also no assembly cost such as would be necessary for the screw coupling of the two individual components.

As a result of the better utilization of materials with higher specific mechanical characteristics and component integration, there is a higher economic potential compared with the screwed together individual components made from metallic materials.

The weight saving also contributes to permitting further scaling up of the wind energy plants, because in connection therewith specifically the tower top weight of the wind energy plant constitutes a critical aspect.

BRIEF DESCRIPTION OF THE DRAWINGS

Further features and advantages of the present invention can be gathered from the following descriptions of the preferred embodiment with reference to the attached drawing, wherein.

DETAILED DESCRIPTION OF THE PREFERRED EMBODIMENT

Figure 1:
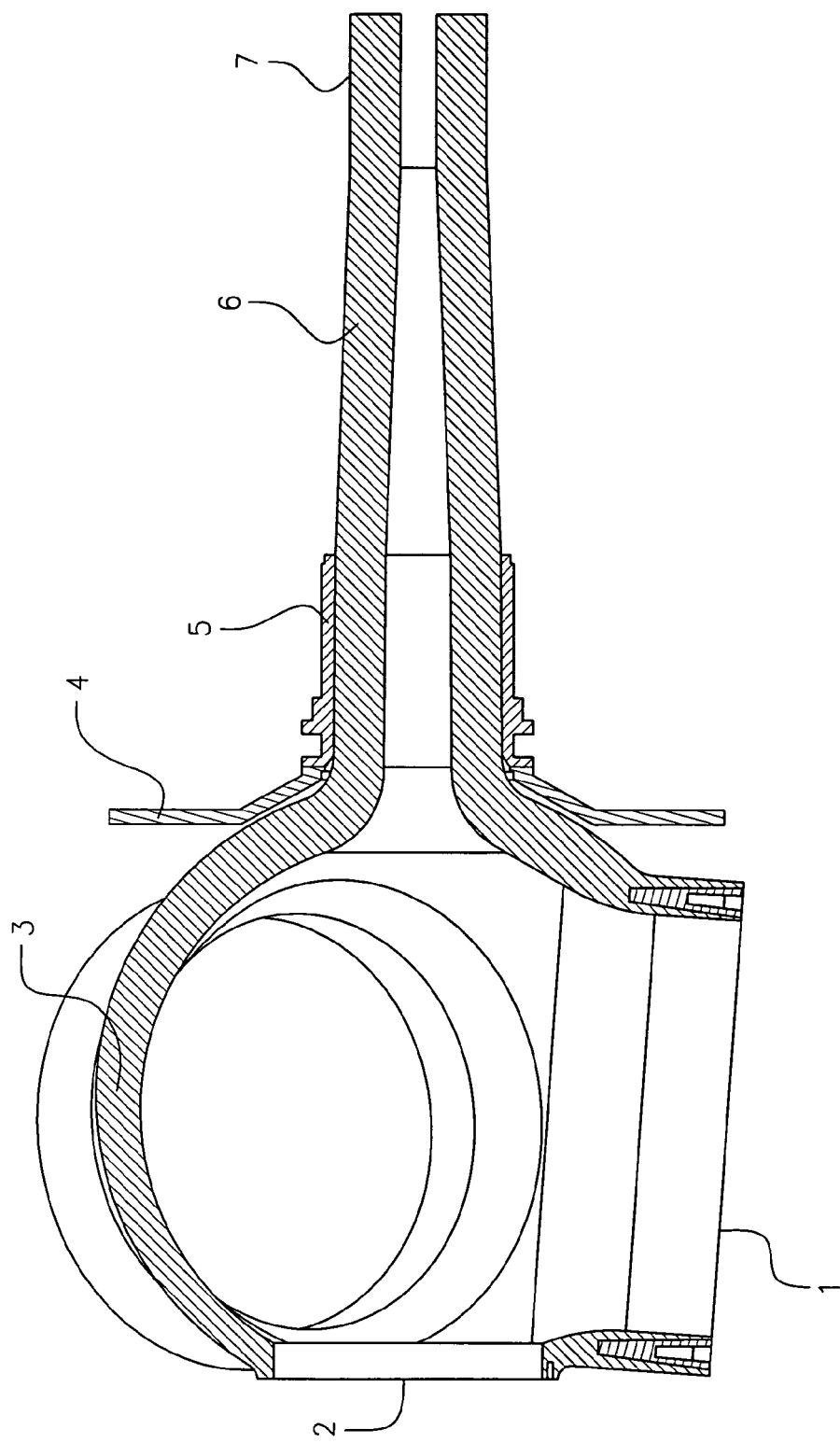
FIG. 1 shows a cross-sectional view through the rotor shaft/hub combination of the shaft/hub unit for a wind turbine rotor.

The component body comprising the rotor hub 3 and rotor shaft 6 is made from bonded fiber fabric. The blade or blade bearing connection 1 is used for joining the rotor blade directly or via a bearing to the hub 3. This junction or connection comprises metallic inserts with blind hole threads integrated into the laminate of the rotor hub 3. In the front of the rotor hub 3 is provided an access hole 2 giving access to the interior of the rotor hub 3. A rotor locking disk 4 is used for locking the wind energy plant rotor during maintenance and is connected by a bonded or screwed joint directly to the rotor hub 3 or rotor bearing seat 5. The rotor locking disk 4 is made either from a metallic material or a bonded fiber fabric. The rotor bearing seat 5 is used for receiving the rotor bearing and is constructed in the form of a bush made from metal, plastic or a bonded fiber fabric. This bush is either integrated into the laminate of the rotor shaft 6, or connected from the outside by a bonded and/or screwed joint to the laminate of the rotor shaft 6. The rotor shaft is connected to the gear by tightening disk and guidance means 7.

Having thus described the invention, what is claimed and desired to be secured by Letters Patent is:

1. A combined rotor shaft and rotor hub unit for use with a wind energy plant, the combined rotor shaft and rotor hub unit comprising:
   a) a rotor shaft portion and a rotor hub portion;
   b) a rotor bearing seat coupled to the combined rotor shaft and rotor hub unit intermediate the rotor shaft portion and the rotor hub portion;
   c) a blade or blade bearing connection attaching a rotor blade to the rotor hub portion directly thereto or by a bearing, and
   d) the rotor shaft portion and the rotor hub portion integrally constructed as a single member from a fabric material of bonded fibers for forming the combined rotor shaft and rotor hub unit.

2. The combined rotor shaft and rotor hub unit of claim 1, further comprising the rotor hub portion constructed as a laminate.

3. The combined rotor shaft and rotor hub unit of claim 2, wherein the blade or blade bearing connection is formed by metallic inserts which are integrated into the rotor hub portion laminate.

4. The combined rotor shaft and rotor hub unit of claim 1, further comprising the rotor shaft portion constructed as a laminate.

5. The combined rotor shaft and hub unit of claim 4, wherein the bearing seat is formed as a bush and is integrated into the rotor shaft portion laminate.

6. The combined rotor shaft and hub unit of claim 3, wherein the bearing seat is formed as a bush and is integrated into the rotor shaft portion laminate.

7. A combined rotor shaft and rotor hub unit for use with a wind energy plant, the combined rotor shaft and rotor hub unit comprising:
   a) a rotor shaft portion constructed as a laminate;
   b) a rotor hub portion constructed as a laminate;
   c) a rotor bearing seat coupled intermediate the rotor shaft portion and the rotor hub portion, the rotor bearing seat formed as a bush and integrated into the rotor shaft portion laminate;
   d) a blade or blade bearing connection attaching a rotor blade to the rotor hub portion directly thereto or by a bearing, the blade or blade bearing connection formed by metallic inserts integrated into the rotor hub portion laminate; and
   e) the rotor shaft portion and the rotor hub portion integrally constructed as a single member from a fabric material of bonded fibers forming the combined rotor shaft and rotor hub unit.

* * * * *